No. 857,394. PATENTED JUNE 18, 1907.
W. HALLOCK.
GENERATOR FOR ALTERNATING ELECTRIC CURRENTS.
APPLICATION FILED SEPT. 21, 1906.

3 SHEETS—SHEET 1.

WITNESSES
Max B. A. Doring
Frank L. Stubb

INVENTOR
William Hallock
BY
W. B. Hutchinson
ATTORNEY

No. 857,394. PATENTED JUNE 18, 1907.
W. HALLOCK.
GENERATOR FOR ALTERNATING ELECTRIC CURRENTS.
APPLICATION FILED SEPT. 21, 1906.

3 SHEETS—SHEET 2.

WITNESSES
Max B. A. Doring
Frank L. Stubbs

INVENTOR
William Hallock,
BY
W. B. Hutchinson,
ATTORNEY

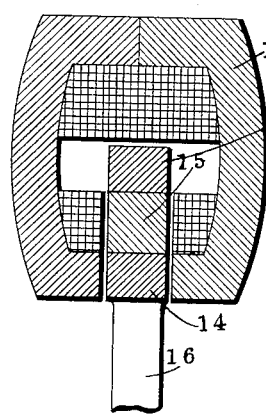
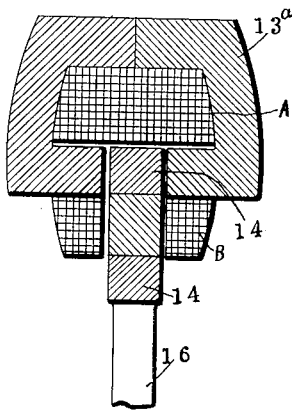
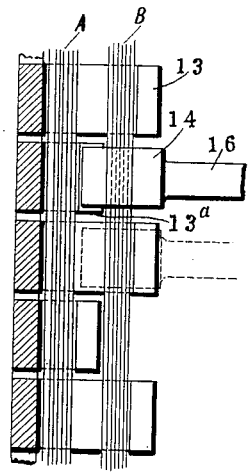
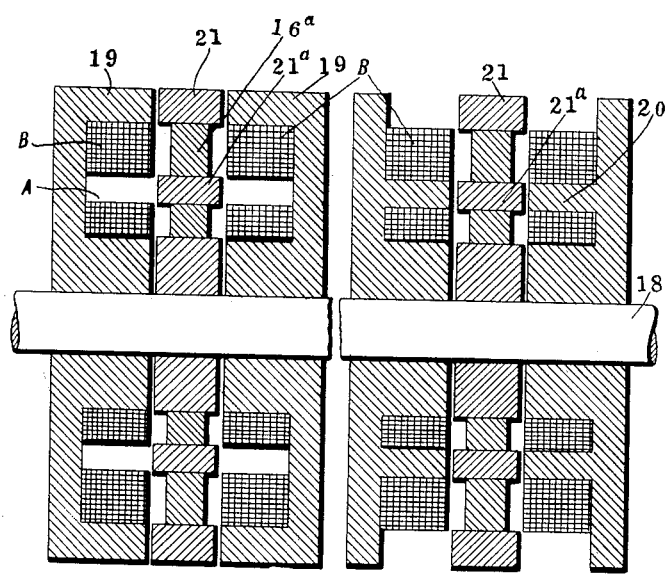

UNITED STATES PATENT OFFICE.

WILLIAM HALLOCK, OF NEW YORK, N. Y.

GENERATOR FOR ALTERNATING ELECTRIC CURRENTS.

No. 857,394.     Specification of Letters Patent.     Patented June 18, 1907.

Application filed September 21, 1906. Serial No. 335,541.

*To all whom it may concern:*

Be it known that I, WILLIAM HALLOCK, of the city, county, and State of New York, have invented a new and useful Improvement in Generators for Alternating Electric Currents, of which the following is a full, clear, and exact description.

My invention relates to improvements in electric generators and especially to that type of generator known as inductor generators and which generate an alternating electric current.

The object of my invention is to produce a particularly simple and inexpensive arrangement of the interlocking and magnetic circuits whereby the magnetic circuit is not reversed in any part at any time, and the arrangement of coils is especially efficient. All to the end that a generator may be built of cheap and simple construction and especial high efficiency.

To these ends my invention consists of an alternating electric generator, the construction and operation of which will be hereinafter clearly described and the novel features claimed.

Reference is to be had to the accompanying drawings forming a part of this specification in which similar letters and figures of reference indicate corresponding parts in all views.

Figure 1:
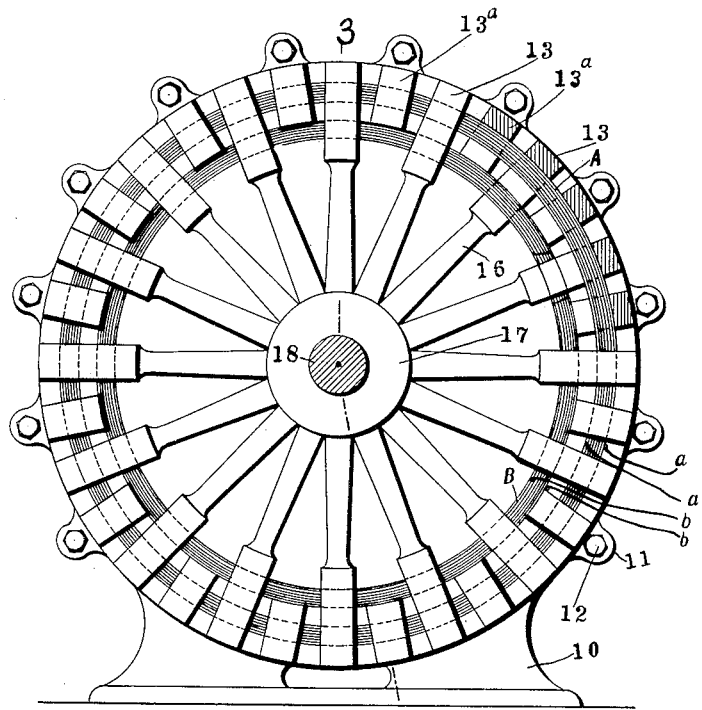
Figure 2:
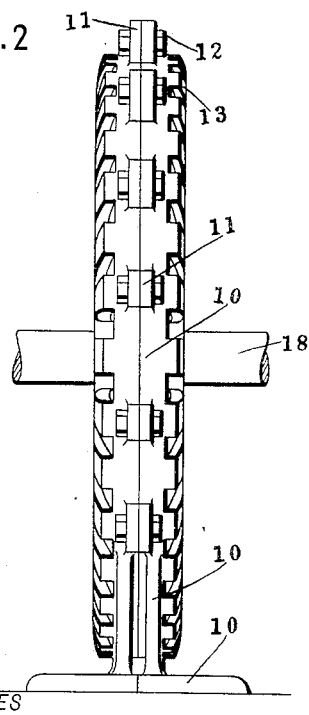
Figure 3:
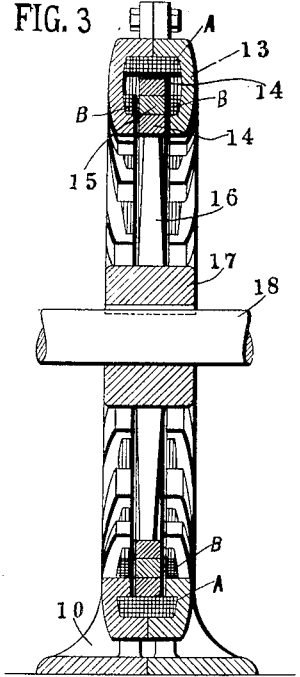
Figure 4:
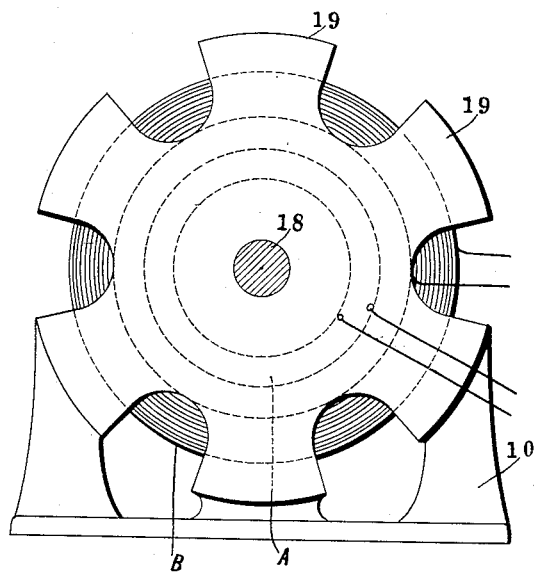
Figure 5:
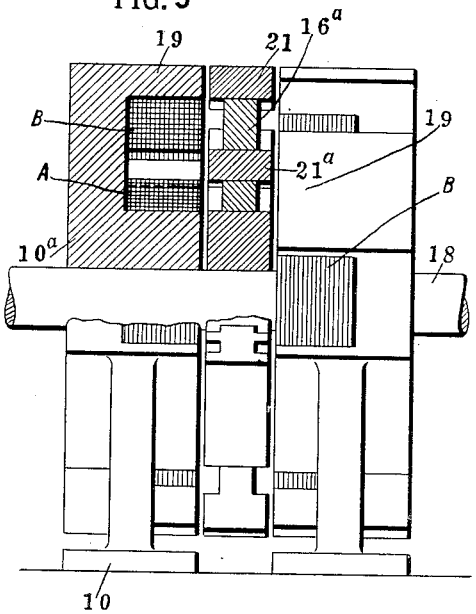
Figure 6:
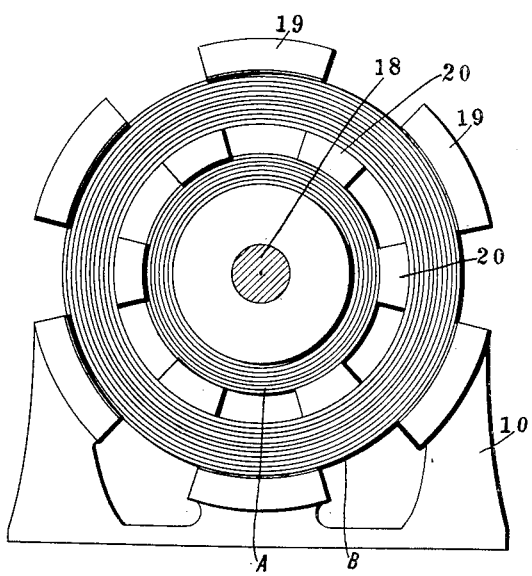
Figure 7:
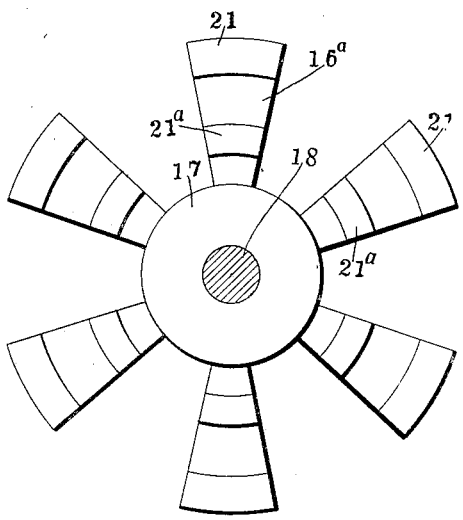

Figure 1 is a side elevation of the generator embodying my invention. Fig. 2 is an edge or front view of the same; Fig. 3 is a section on the line 3—3 of Fig. 1. Fig. 4 is a sectional elevation of a modified form of the invention. Fig. 5 is a front view partly in vertical longitudinal section of the construction shown in Fig. 4. Fig. 6 is an inside elevation of the structures shown in Figs. 4 and 5, and shows the arrangement of the coils and the polar projections. Fig. 7 is a detail elevation of the rotor. Fig. 8 is a detail cross-section or radial section through one of the long polar projections. Fig. 9 is a view similar to Fig. 8, but through one of the short polar projections. Fig. 10 is a sectional diagrammatic development of the generator especially shown in Figs. 8 and 9. Fig. 11 is a vertical longitudinal section of a modified form of the generator showing the outer pole pieces or projections. Fig. 12 is a view similar to Fig. 11, but showing the inner polar projections; and Fig. 13 is a diagrammatic development of the structure as shown in Figs. 11 and 12.

The generator is provided with opposed large castings 10 which form practically a "stator" or field casting and these sections can be secured in any convenient way, but are preferably provided with meeting lugs 11 through which fastening bolts 12 can be passed. The casting is provided with a series of radially arranged polar projections 13 and $13^a$ which are relatively long and short as shown clearly in Fig. 1 and the casting, including the pole pieces or projections can conveniently and effectively be cast iron, or the polar projections hereinafter described, may be laminated.

As shown in Figs. 1 to 3 the polar projections which are hollow and open in the inner sides as shown in Fig. 3, contain the field coil A which is arranged on the outer wall of the several pole pieces or projections 13 and $13^a$ and the two portions B of the generating coil, these coils A and B having suitable terminals *a* and *b*. Turning through the polar projections 13 and $13^a$ are the magnetic connecting pieces 14 which are preferably separated by a strip of non-magnetic material 15, and these connecting pieces 14 are preferably laminated. The connecting pieces and non-magnetic block 15 are carried on the ends of the spokes 16 of the rotor and these project regularly from the hub 17 which is carried by the shaft 18 and the latter can be driven in any usual way. In the several drawings the structure shown in Fig. 1, to 3 is especially adapted for a large sized generator and in the several views I have shown a single rotor, but it will, of course, be understood that this structure can be duplicated on a single shaft to any desired extent. The structure which I have just described is, as stated, well adapted to large sized generators and heretofore it has been found difficult to make generators of this type in large sizes.

In the structure described above, when the rotor is turned, the field coil A produces a magnetic flux, the magnetic circuit being around it through the field casting 10, the polar projections 13 and $13^a$ and the connecting pieces 14 of the rotor. In a general way the lines of magnetic flux are similar to a string wound on and through an anchor ring, or, in other words, the lines would represent a sine curve and the flux always experiences the same reluctance. When the spokes 16 of the rotor are in a position such that they lie between the shorter polar projections $13^a$, as shown in Fig. 9 then the magnetic flux is entirely outside of the generating coil B. It passes through the casting 10, the short polar projection 13ª and the outer connection piece 14 on the rotor spokes. In this position none of the magnetic flux threads through the generating coil B. When the rotor has moved forward so that the spoke ends lie between the longer polar projections 13 as shown in Fig. 8, then the magnetic flux is through the longer polar projections 13 and the inner connecting pieces 14 on the spokes 16 of the rotor. In this position all the magnetic flux threads through the generating coil B as well as through the field coil A. Thus while moving from the position shown in Fig. 9 to that shown in Fig. 8, all the magnetic flux is made to cut into the generating coil B thereby inducing an electric current therein. While moving forward the rotor from the position shown in Fig. 8 to that on the next shorter projection 13ª, corresponding to a repetition of Fig. 9, all the magnetic flux is made to cut out of the generating coil B thereby inducing a current of electricity in a directon opposite to the one above referred to. Thus as the rotor continually rotates, as many alternating electric currents are generated as there are polar projections, that is, twice as many as there are spokes upon the rotor; there will be as many complete cycles as there are spokes on the rotor. Fig. 1 shows a generator with 16 spokes and 16 long and short polar projections and consequently of 16. cycles per revolution, but it is evident that the same plan of construction and operation could as well be applied to either a smaller or greater number of cycles per revolution.

Referring to the other generator, or modification, it will be seen that the rotor turns between opposite castings and that the polar projections are slightly different in their arrangement. In this case the coil A is arranged in the inner part of the casting and the coil B upon the outer part and the outer and inner pole pieces or polar projections 19 and 20 are staggered in relation to each other as clearly shown in Fig. 6. The rotor as shown in Fig. 7 has spokes 16ª with connecting pieces 21 turning opposite the pole pieces 19 and connecting pieces 21ª turning opposite the pole piece 20. In this construction the two halves of the field coil A produce a magnetic flux through the hub of the rotor and the central portion of the machine 10ª which is completed around the outside through the polar projections and the connecting pieces on the spokes of the rotor. When the rotor is in the position indicated at Fig. 12 all the flux passes through the inner polar projections 20 and through the inner connecting pieces 21ª of the rotor, thus being entirely inside of the generator coil B, and when the rotor is moved forward to the position indicated by Fig. 11, the flux is entirely through the outer polar projections 19 and the outer connecting pieces 21 on the spokes of the rotor. In this position the magnetic circuit includes the generating coil B. In the first position none of the magnetic flux threads the generating coil B and in the second position all the magnetic flux threads the said generating coil; hence in passing from one position to the other an electric current is induced in the said coil B. In passing to the next position, corresponding to Fig. 12, an electric current will be similarly generated in the opposite direction; here again there will be as many complete cycles per revolution of the rotor as there are spokes in the rotor and polar projections in each of the sets. In the machine indicated I have shown six, but evidently a greater or less number could be employed.

The above description and drawings set forth clearly the principle and operation of the machine, but it will be clearly seen that the minor details of construction, the design, form and materials can be considerably changed without affecting the principle of the invention. It will be further seen that the invention is extremely simple, and my experiments have shown that this arrangement of the parts produces a generator of very high efficiency.

Having thus fully described my invention, I claim as new and desire to secure by Letters Patent:

1. An alternating current generator having concentrically arranged field and generating coils, a field with concentric sets of polar projections staggered radially with relation to each other, and a rotor traversing the field and having connecting pieces or projections turning opposite the field projections, whereby the magnetic circuit alternately includes the field coil only and the field and generating coils.

2. An alternating electric generator having stationary staggered pole pieces in the field, a rotor traversing the field and having connecting pieces turning opposite the polar projections, and concentrically arranged field and generating coils, each comprising a single coil, and the coils being placed on opposite sides of the inner polar projections.

3. An alternating current generator comprising a field having two sets of polar projections radially staggered with reference to each other, a single field coil, a generating coil, and a rotor without winding turning opposite the said polar projections, the said rotor having concentrically arranged magnetic connecting pieces separated by nonmagnetic material.

4. An alternating current generator comprising a field having sets of concentrically arranged but radially staggered pole pieces, concentrically arranged field and generating coils, each comprising a single coil, and the coils being arranged adjacent to the pole pieces, and a rotor turning opposite the said polar projections, said rotor having concentrically arranged magnetic connecting pieces turning opposite the aforesaid polar projections.

5. An alternating current generator, comprising a field having radially arranged polar projections in two concentric sets, the projections of each set being spaced apart, field and generating coils arranged concentrically and on radially opposite sides of the inner set of polar projections, and a rotor having spokes carrying connecting pieces to turn opposite the said polar projections, whereby at each revolution of the rotor there are as many complete cycles per revolution as there are spokes on the rotor.

WILLIAM HALLOCK.

Witnesses:
T. B. JOHNSON,
WARREN B. HUTCHINSON.